United States Patent [19]

Piereth et al.

[11] Patent Number: 4,677,609
[45] Date of Patent: Jun. 30, 1987

[54] SEMI-AUTOMATED DIRECTORY ASSISTANCE SYSTEMS

[75] Inventors: Richard J. Piereth; Robert L. Potter; John R. Williams, all of Naperville, Ill.

[73] Assignee: American Telephone and Telegraph Company, AT&T Bell Laboratories, Murray Hill, N.J.

[21] Appl. No.: 731,885

[22] Filed: May 8, 1985

[51] Int. Cl.$^4$ ............................................ H04Q 11/04
[52] U.S. Cl. ...................................... 370/60; 379/260
[58] Field of Search ............................. 370/58, 60, 94; 179/27 D, 27 FF, 18 B, 27 FG

[56] References Cited

U.S. PATENT DOCUMENTS

| | | | |
|---|---|---|---|
| 3,539,733 | 11/1970 | Morris et al. | 179/27 |
| 3,549,816 | 12/1970 | Fenstermaker et al. | 179/27 |
| 3,643,034 | 2/1972 | Burns et al. | 179/27 D |
| 4,145,578 | 3/1979 | Orriss | 179/27 FF |
| 4,408,100 | 10/1983 | Pritz et al. | 179/27 D |
| 4,484,031 | 11/1984 | Gray et al. | 179/27 D |
| 4,592,048 | 5/1986 | Beckner et al. | 370/60 |
| 4,620,066 | 10/1986 | Bushnell et al. | 179/27 FF |

OTHER PUBLICATIONS

"DMS-200 Operator Services Planning Letter," *Northern Telecom.*, (Manufacturer's Brochure), Jan. 26, 1984, pp. 60-68.

"DMS-200 (AOSS) Auxiliary Operator Services System," *Northern Telecom. Courier*, DC-16, Nov. 1983, pp. 1-12.

"TOPS Operator Centralization DMS-200," *Northern Telecom.*, (Manufacturer's Brochure), Nov. 1983, pp. 1-3.

N. X. DeLessio et al., "An Integrated Operator Services Capability for the 5ESS TM Switching System," *ISS '84* (Florence), Session 22C, Paper 3, May 1984, pp. 1-5.

J. W. Johnson et al., "Integrated Digital Services on the 5ESS TM System," *ISS '84* (Florence), Session 14A, Paper 3, May 1984, pp. 1-8.

"Operator Services Position System," *AT&T Technologies, Inc.*, (Manufacturer's Brochure), 1984, pp. 1-8.

P. E. Molloy et al., "No. 5 Crossbar Automatic Call Distributor," *Bell Laboratories Record*, vol. 46, No. 11, Dec. 1968, pp. 370-376.

K. Fung et al., "Integrated Digital Access Design for ISDN," *IEEE International Conference on Communications*, vol. 2, Jun. 19-22, 1983, pp. 1389-1395.

T. Andersson et al., "Operator Services in AXE 10. Addition of a New Subsystem," *IEEE International Conference on Communications*, vol. 2, Jun. 13-17, 1982, pp. 31.3.1-31.3.5.

D. V. Glen, "Integrated Services Digital Networks, Standards, and Related Technology," *U.S. Department of Commerce*, Jun. 1982, pp. 1-133.

J. B. Jacob et al., "The E10.B Digital Switching System: Towards the Integrated Services Digital Network (ISDN)," *International Switching Symposium* 1981 (Montreal), Session 14A, Paper 3, Sep. 1981, pp. 1-6.

(List continued on next page.)

Primary Examiner—Douglas W. Olms
Assistant Examiner—Curtis Kuntz
Attorney, Agent, or Firm—Werner Ulrich; Peter Visserman

[57] ABSTRACT

A semi-automatic directory assistance system uses a directory assistance computer to help an operator at an operator position terminal find the requested directory number. The control processor, a module control unit, of a module of the system controls the establishment of part of the connection from a subscriber requesting operator assistance to the operator position. The operator at the operator position communicates with the directory assistance computer to find the requested number. After the requested number has been found, the computer sends a message to the control processor. In response to that message, the control processor causes an audio response unit to generate a directory assistance message corresponding to the desired number and causes the response unit to be connected to the subscriber.

19 Claims, 5 Drawing Figures

OTHER PUBLICATIONS

G. Oliver et al., "The Subscriber Terminal Concentrator E10-CT and Its Use in the French Electronic Telephone Directory Service," *International Switching Symposium* 1981 (Montreal), Session 14A, Paper 4, Sep. 1981, pp. 1-8.

M. Ballard et al., "The E10.S-TSS.5: A Multipurpose Digital Switching System," *International Switching Symposium* 1981 (Montreal), Session 14A, Paper 1, Sep. 1981, pp. 1-9.

R. Delit et al., "ITT 1240 Digital Exchange Operator Subsystem," *Electrical Communication,* vol. 56, No. 2/3, 1981, pp. 248-263.

SEMI-AUTOMATED DIRECTORY ASSISTANCE SYSTEMS

TECHNICAL FIELD

This invention relates to communication assistance systems for use in switching networks and, particularly, to directory assistance systems utilizing computer aided directory number services.

BACKGROUND OF THE INVENTION

Directory assistance services are provided to help telephone subscribers locate telephone directory numbers of other subscribers. The services are customarily provided by a directory assistance operator connected to the requesting customer via a switching system. Early designs of directory assistance systems required operators to refer to books and file cards to find the desired directory numbers. As directory assistance traffic increased, more efficient and automated techniques and systems were introduced to aid operators in furnishing the required service.

One directory assistance system currently in commercial use, the No. 5 Crossbar Automatic Call Distribution System manufactured by AT&T Technologies, Inc., provides each directory assistance operator with a terminal for communicating with a directory assistance computer. In this system, a subscriber's call requesting directory assistance is routed via a special purpose incoming trunk which is connected to a switching network, for establishing a switchable voice connection to an operator, and is permanently connected to an audio response unit. For each assistance call, the operator verbally requests data regarding the subscriber to be called and, upon its receipt, communicates with a directory assistance computer and concurrently controls a connection of the incoming trunk to the computer terminal. Next, the audio response unit receives data from a switching network controller that a particular incoming trunk has been connected to the computer terminal serving that operator. When the computer has located the correct directory number, it sends a message to the audio response unit causing it to generate an audible directory announcement representing the desired directory number and transmits that voice message to the customer via the permanent path to the previously identified incoming trunk.

Such an arrangement is expensive because it requires the use of expensive special purpose trunks to connect the customer to the switching network and separately to the audio response unit. Further, the audio response unit requires a large number of output ports permanently connected to each of the special purpose trunk circuits. A recognized problem of the prior art is that such computerized directory assistance systems need costly complicated and separate control units for both the switching network and the audio response unit, as well as separate connections to the switching network and the audio response unit. The assistance equipment unit additionally can serve only one call at a time per port with its inherent delays, particularly, for lengthy operation communications.

SUMMARY OF THE INVENTION

The foregoing problem and deficiencies are solved and a technical advance is achieved in accordance with an illustrative embodiment of the invention in which a switching system for directory assistance is advantageously provided with common control means and a data link architecture for controlling the subscriber-to-operator connection as well as the subscriber-to-audio response unit connection. In accordance with this invention, the operator positions and the audio response unit are connected to one side of a switching network and a subscriber's call for directory assistance is routed to a network terminal on the other side of the network. The common control unit, in response to the incoming call establishes a path through the network to an operator position where the call will be handled. The control unit is further responsive to signals from the operator position and from the directory assistance computer to take down the connection from the subscriber to the operator position and to establish a connection through the switching network from the subscriber to the announcement unit. Advantageously, this arrangement avoids expensive special purpose trunk circuits and a multiplicity of permanent connections from the announcement unit to the special purpose trunk circuits. Additionally, the network, under control of the control unit, advantageously connects the audio response unit to the calling subscriber for the period that the audio message is to be transmitted and is arranged efficiently to serve a number of subscriber calls concurrently.

In one specific embodiment of the invention, a subscriber requesting directory assistance is connected through a voice connection with a directory assistance operator position. The operator position includes a terminal for direct communication with a directory assistance computer. An operator at the operator position, through communications with the subscriber and the computer performs the directory assistance search. Upon completion of the requested search, the common control unit disconnects the operator from the subscriber and, in response to a message from the directory assistance computer establishes a connection through the network from the audio response unit to the subscriber and controls the audio response unit to provide a voice message announcing the requested directory number.

In an alternative embodiment of the invention, the operator position is connected to the directory assistance computer via path through the switching network established under control of the common control unit only when needed.

Advantageously, a system in accordance with this invention establishes an economical and efficient base for furnishing directory assistance services at a reasonable cost to customers and to the provider of the services.

A feature of the invention is that the switching network comprises a time-slot interchange means for establishing the incoming call and assistance connections to the operator position and the announcement unit for the assistance call processing.

Another feature is that the common control means communicates with the assistance computer via a packet switching interface unit and a data link architecture.

It is a feature that the common control means is activated in response to a receipt of a call on an incoming network link to extend call connections from the network link to the assistance operator. The common control unit is further operated in response to commands received from the assistance computer selectively via the time-slot interchanger packet switching interface unit and the data links for connecting the audio response unit via the time-slot interchanger to the network link for communication of an assistance message thereover.

BRIEF DESCRIPTION OF THE DRAWINGS

The invention will be better understood from the following detailed description when read with reference to the drawing in which.

DETAILED DESCRIPTION

As the world's telecommunications networks become more sophisticated, operator services remain as important as ever. Because of the continuing need for operator assistance, a new digital, cordless Operator Services Capability is being developed as an integrated component of the 5ESS Switching System. The 5ESS TM Switching System is described in J. H. Davis, et al., *5ESS System Evolution,* International Switching Symposium, 1984. This new Operator Services Capability builds upon the Integrated Services Digital Network (ISDN) features of the *5ESS Switching System. This is described further in J. A. Davis, et al., Integrated Digital Services on the* 5ESS System, International Switching Symposium, 1984. This architecture has the flexibility to provide traditional operator services and meets the needs of anticipated future information age services. Before discussing the features and architecture of this new Operator Services Capability, a brief history of operator service system evolution is presented.

OPERATOR SERVICE SYSTEM EVOLUTION

Traditional operator services can be grouped into two major classification:

I. Toll and Assistance (T&A) operators who assist with calls which cannot be automatically completed.

II Number Service operators who provide information necessary for call completion.

T&A operators perform a number of services such as providing dialing instructions, assisting in call completion, handling coin calls, and handling specially billed calls such as collect, person-to-person, bill-to-third number, and credit card calls. Number Service operators perform Directory Assistance (DA) by providing telephone numbers to both subscribers and other operators, rate and route assistance by providing special routing codes and rating information to T&A operators, and intercept service by assisting customers who have dialed nonworking or recently changed telephone numbers. The term directory assistance system as used herein refers to a system which performs the directory assistance function and may perform other functions. By far, the majority of operators perform either T&A or DA functions.

Directory Assistance

Number services such as DA date back to the early 1900's in the United States. At that time, operators used books or a rotary card index file to find a desired number. By the 1970's, call distribution to DA operators had been improved through the use of Automatic Call Distributors (ACD). The first modern ACD in the United States was the No. 23 ACD, a crossbar switch that could distribute calls uniformly to over 100 operators. Today the No. 5 ACD is the primary used for DA call distribution. It, too, is a modified crossbar switch, but can accommodate up to 500 operators.

DA operators require access to a large information base to find directory listings. As DA traffic increased, more efficient techniques than books and file cards were needed to handle these calls in order to minimize the growth of the DA operator work force and, thereby, keep the cost of DA service low. These microfilm-based DA system (DAS/M) were then automated through computer control. Today, the DAS/M systems are being replaced by computerized DA systems (DAS/C) in which the directory numbers are stored on disk memory. DAS/C systems are more economical because the records can be updated more easily and the listing retrieval time is much faster.

A recent addition to DAS/C systems has been the use of Audio Response Units (ARU). Rather than orally providing the customer with the requested directory number, the operator indicates the correct number to the DAS/C. The operator is dropped from the call while the ARU, under computer control, concatenates digitally encoded speech phrases and announces the number to the customer. While the announcement is played to the customer, the operator is free to handle another call. The use of an ARU increases the DA operator efficiency by significantly reducing the call work time.

OPERATOR SERVICES CAPABILITY FOR THE 5ESS SWITCHING SYSTEM

Integrated Design

The rapid digital evolution of the world's telecommunication networks, coupled with unprecedented growth and change in telecommunications services, has motivated the development of the new 5ESS Integrated Operator Services Capability. The integration of the Operator Services Capability with the 5ESS Switching System contributes to system economy and efficiency through the sharing of resources with the host switch. Common software performs many functions such as circuit and packet switching, call timing, call supervision monitoring, and billing. Common hardware results in simpler and less costly maintenance, as well as a reduction in spare equipment inventories. The integrated system allows greater efficiency to be gained by combining direct distance dialed (DDD) and operator assisted calls on the same switch. The 5ESS Integrated Operator Services Capability can be physically located at any point in a network hierarchy as part of either a local or transit exchange, or a 5ESS Switch dedicated to operator services can be situated behind one or more exchanges in the network as a stand-alone operator system.

Digital Design

The Operator Services Capability has a completely digital design extending to the operator position. Digital technology has been applied providing a cost efficient and compact design. The digital design and use of International Telegraph and Telephone Consultative Committee (CCITT) recommended standard data transmission protocols have been applied to make the Operator Services Capability compatible with the future worldwide ISDN environment. These design criteria provide system flexibility for service to both voice and data customers.

Modular Design

The modular design of the 5ESS Switching System has been extended to the design and development of the Operator Services Capability. The size of an operator office is flexible and can be configured to meet the needs of any Telephone Company Administration (TCA). The system may have a few positions on an initial installation and easily grow to several hundreds of positions without compromising the host switching system's capacity. Operator offices can be located at the host switch or remoted via digital carrier to meet geographic or demographic constraints.

Cordless Operation

As with the previous generation of operator assistance systems, the 5ESS Integrated Operator System Capability has cordless operator positions. The SPC nature of the 5ESS Switching System allows it to process all operator commands entered from the position keyboard and perform all functions required to complete operator assisted calls.

Features

The 5ESS Integrated Operator Service Capability is designed for worldwide use and can provide a broad range of operator and attendant services. The initial features of the system provide national and international T&A services as well as DA service.

For the DA application, the Integrated Operator Services Capability provides call distribution to operators and automatic number announcement to the customer. The directory lookup is performed using a separate Directory Assistance Computer DAS/C. The 5ESS Switching System and the DAS/C communicate via data links to coordinate call processing actions and pass directory numbers from the DAS/C to the switch for announcement via an ARU. The ARU is integrated into the 5ESS Switch as a unit on Switching Modules (SMs) handling operators. It is accessed via the system's network and, therefore, can play an announcement to any line or trunk terminating on the host switch.

ARCHITECTURE

Figure 1:
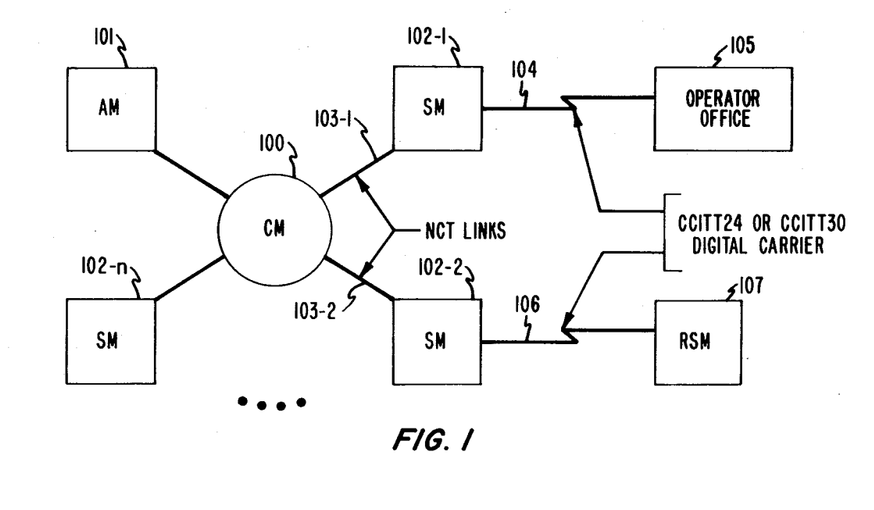
FIG. 1 is a system block diagram of an exemplary switching system connected to a remote module and an operator office.
Figure 2:
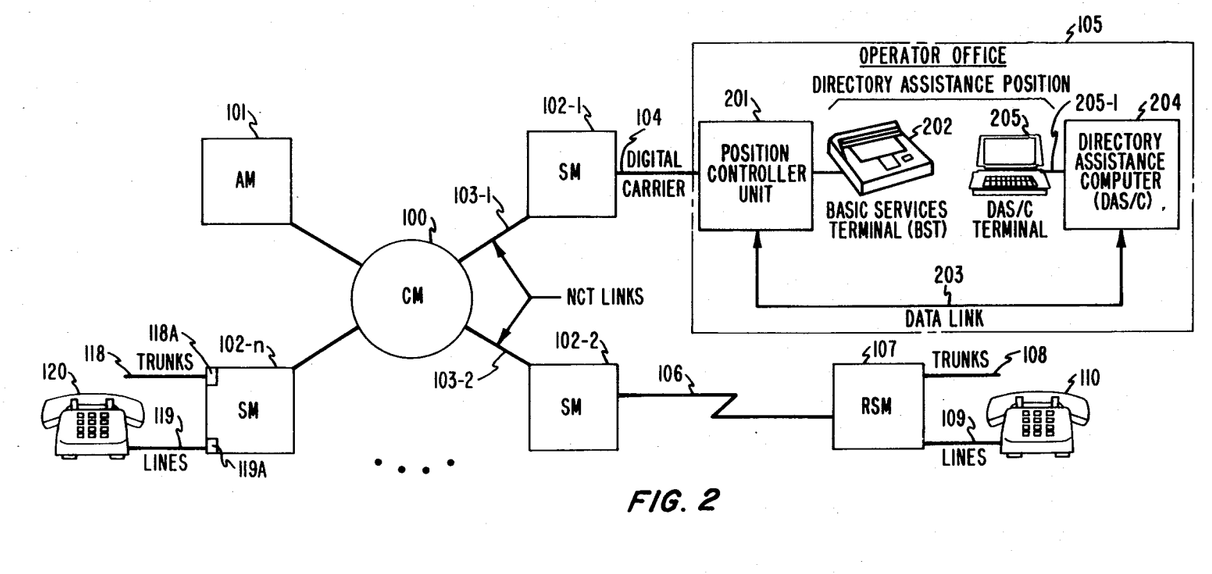
FIGS. 2 and 3 show details of operator position inside an operator office.
Figure 3:
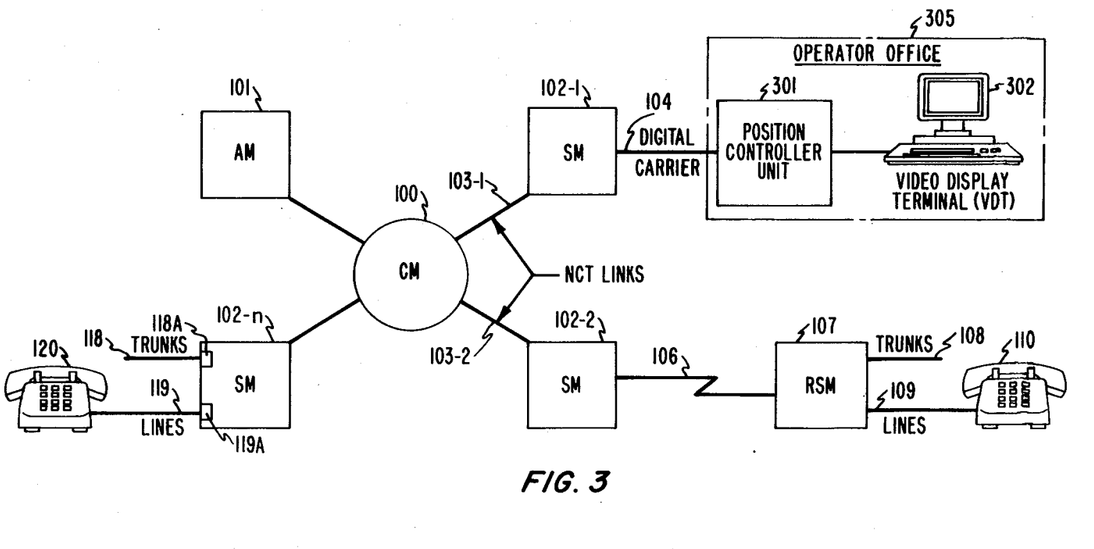

FIG. 1 shows the Operator Services Capability integrated into the architecture of the 5ESS Switching System. One architecture supports all operator services by simply matching the operator terminal used to the needs of the specific application. FIG. 2 illustrates the Operator Services Capability used as an ACD for a DA application with computerized data retrieval. A T&A application is shown in FIG. 3.

FIG. 1 shows a typical 5ESS system. The system comprises a communication module 100 which interconnects a group of switching modules 102-1, 102-2, . . . 102-n and an administrative module 101. The administrative module carries out functions common to the 5ESS switch. The switching modules are connected to the communication module 100, a time multiplexed space division switch, by a group of network, control, and timing (NCT) links such as 103-1 and 103-2. The NCT links carry communications (network) signals, control signals among module control units and the administrative module and serve as a source of timing for the time slot interchangers.

Switching module 102-1 is connected via a digital carrier facility 104 to an operator office 105. Similarly, switching module 102-2 is connected by a digital carrier link 106 to a remote switching module 107.

FIG. 2 shows further details. Switching module 102-n is connected to trunks such as 118 and to lines such as 119 connected to customer station such as 120.

Subscriber lines such as line 119 are connected to a port 119A for interfacing with switching module 102n. Similarly, trunks such as trunk 118 are connected to a port 118A for interfacing with switching module 102n. The ports are an interface between the switching network and connected transmission units such as customer lines, trunks to other offices, multiplexed transmission facilities, and data interfaces to data communication systems and to control processors. For a customer line, a port may be a line circuit which converts analog to digital signals, provides service request detection facilities and otherwise interfaces between the digital signals of a digital network and the analog signals of a conventional customer loop. For a trunk, the interface may be a facility interface with one channel of a frequency division multiplexed transmission facility. For use with time division multiplex facilities, such as the T1 carrier system manufactured by AT&T Technologies, Incorporated, or time division subscriber loop carrier systems, the port may directly interface a digital signal, carrying a number of time multiplexed channels, with the digital switching network. Subscribers and trunks generate customer signals, such as dialed number signals, to indicate requests to a switching system.

Remote switching module 107 is connected to trunks such as 108, lines such as 109 connected to customer station 110. Switching module 102-1 is connected to operator office 105. Operator office 105 includes a position control unit 201 which is connected to a number of basic services terminal 202. A directory assistance position comprises a basis services terminal 202 and a directory assistance terminal 205. The directory assistance computer terminal is connected via a data link 205-1 to a directory assistance computer 204. Directory assistance computer 204 and position controller unit are interconnected by a data link 203.

FIG. 3 shows an operator office used in conjunction with a video display terminal 302 for handling functions such as toll and assistance. Operator office 305 comprises a position controller unit 301 and one or more video display terminals 302.

Like the rest of the 5ESS Switching System, the Operator Services Capability is modularly designed, providing the customer the flexibility to easily grow the system incrementally and economically as traffic requires. The common 5ESS Administrative Module 101 (AM) is used by the Operator Services Capability to provide a single, uniform interface to maintenance personnel and Operational Support Systems (OSS). The maintainability and reliability of the Operator Services System is totally compatible with the host 5ESS Switching System. Shared maintenance features are executed from the 5ESS Maintenance Control Center, eliminating the need for a separate operator services maintenance facility. Additionally, the provision of operator services on the 5ESS Switching System is designed to minimize the impact on the performance of the remainder of the host switch. Most processing required for operator assisted calls is performed in SMs dedicated to the Operator Services Capability.

Operator Position Subsystem

Figure 4:
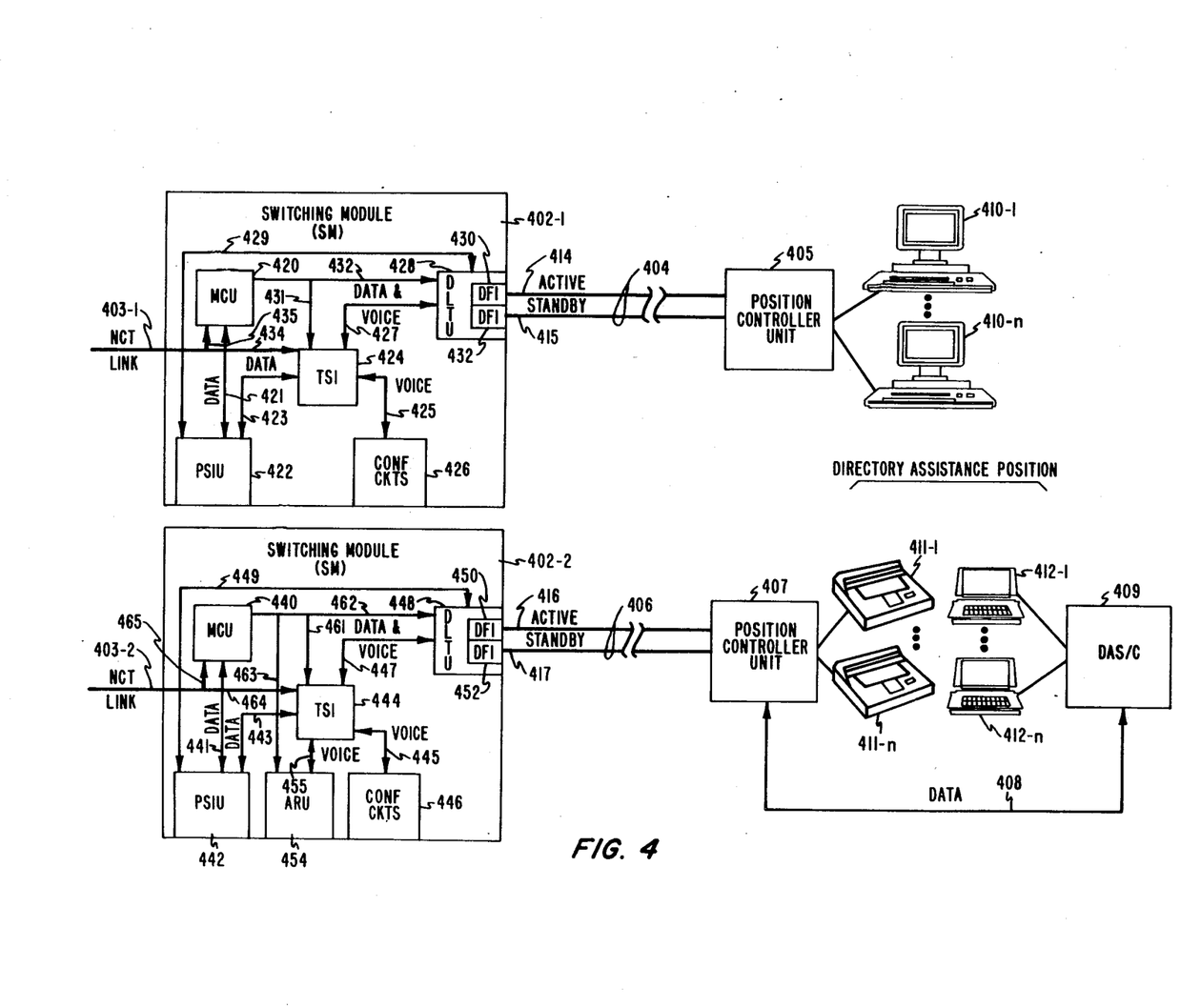
FIG. 4 shows further details of the exemplary switching system.

FIG. 4 presents a more detailed view of the Operator Position Subsystem (OPS). An OPS consists of an SM such as 402-1 or 402-2 equipped with the appropriate units to support operator services. An SM can support approximately 100 operators. A single 5ESS Switching System can support hundreds of operators by equipping multiple SMs. The operators on a single system or a single SM can perform different services as the call distribution algorithms is designed to support multiple serving teams.

FIG. 4 shows two switching modules 402-1 and 402-2 connected to operator positions. 402-1 is connected through duplicated carrier links 414 and 415 to position controller unit 405 which is connected to a group of video display terminals 410-1, . . . , 410-n. The two carrier links 414 and 415 group as group 404 are connected to a pair of digital facilities interfaces 430 and 432. These digital facilities interfaces are part of a digital line and trunk unit 428 which communicates data and voice over link 427 with a time slot interchanger 424. The time slot interchanger is the basic switching element within the switching module. The time slot interchanger is also connected via voice links 425 to conference circuits 426. In addition, the time slot interchanger is connected via data link 423 with a packet switch interface unit 422 which performs packet switching within the switching module 402-1. The packet switching unit is connected via data connection 421 with the module control unit 420 which is the main processor of the switching module. The switching module is connected to the communication module via NCT link 403-1.

FIG. 4 also shows a switching module 402-2 connected to directory assistance positions. The functions of the digital carrier links 416 and 417 grouped in bundle 406 are similar to those of previously discussed digital carrier links 414 and 415 grouped in group 404. The functions of the digital facilities interfaces 450 and 452 in digital line and trunk unit 448 perform functions similar to those described above for units 430, 432 and 428. Time slot interchange 444 connected to the digital line and trunk unit via data and voice channels 447, via voice channel 445 and via data channel 443 performs the same function as time slot interchange 424 and its associated data and voice path 427, voice path 425 and data path 423. In addition, time slot interchange 444 is connected by voice path 455 to audio response unit 454 which generates the response to the customer giving the customer the requested directory number. Conference circuit 446, packet switch 442, data connection 441 and module control unit 440 perform the same functions as the comparable units 426, 422, 421 and 420 in switching module 402-1. Switching module 402-2 is connected to communication module by network control and timing link 403-2.

DLTU 428 and 448 are connected to PSIU 422 and 442 by data paths 429 and 449. In addition, DLTU 428 and 448 are connected to PSIU 422 and 442 by data paths 427 and 447, TSI 424 and 444, and data paths 423 and 443.

MCU 420 and 440 are connected by control paths 432 and 462 to DLTU 428 and 448, respectively and by control paths 431 and 461 to TSI 424 and 444, respectively. NCT links 403-1 and 403-2 are connected to MCU 420 and 440 by paths 435 and 465, respectively, and by voice and data paths 431 and 461 to TSI 424 and 444, respectively. In addition, MCU 44 is connected by control path 463 to ARU 454. When DAS/C computer 409 sends a message comprising the requested directory number, this message goes via position controller 407, one of the carrier links 416 or 417, DLTU 448, data and voice path 447, TSI 444, data path 443, PSIU 442 and data path 441 to MCU 440. MCU 440 uses the data from the DAS/C generated message to generate control signals and via path 463 to ARU 454 to synthesize the proper voice message for transmission to the subscriber, and to generate control signals sent via path 461 to TSI 444 to set up a voice path via NCT link 403-2 between the subscriber and via path 455, ARU 454.

Position controller unit 407 is associated with a group of directory assistance positions. Each of these positions includes two terminals, a basic services terminal such as 411-1 and a terminal 412-1 for communicating with a directory assistance computer DAS/C 409. Each of the end operator positions includes one of the basic services terminals 411-1, . . . , 411-n and one of the directory assistance computer terminals 412-1, . . . , 412-n. Directory assistance computer 409 communicates via data link 408 with position controller unit 407 which passes data between directory assistance computer 409 and switching module 402-2.

Operator traffic arrives on lines and trunks terminating on other SMs or Remote Switching Modules (107, FIG. 1) (RSMs) on the host switch. Remote switching modules are discussed further in R. L. Bennett, et al., *Advances in Remote Switching Concepts*, International Switching Symposium, 1984. Equipment within an SM required for operator services include a Packet Switch Interface Unit (PSIU 422,442) for routing level 3, X.25 data packets to and from the operator terminals, Digital Line and Trunk Units (DLTU 428,448) for terminating CCITT24 or CCITT30 digital carrier, conference circuits for bridging the operator with the calling and called subscribers, Audio Response Units (ARU 454) for playing digitally recorded announcements, local or remote PCUs (405,407), and operator positions. These units support both A-Law and Mu-Law Pulse Code Modulation (PCM) companding. The conference circuits 426,446 can be used to add on up to two additional operators such as a Supervisor or monitor.

Figure 5:
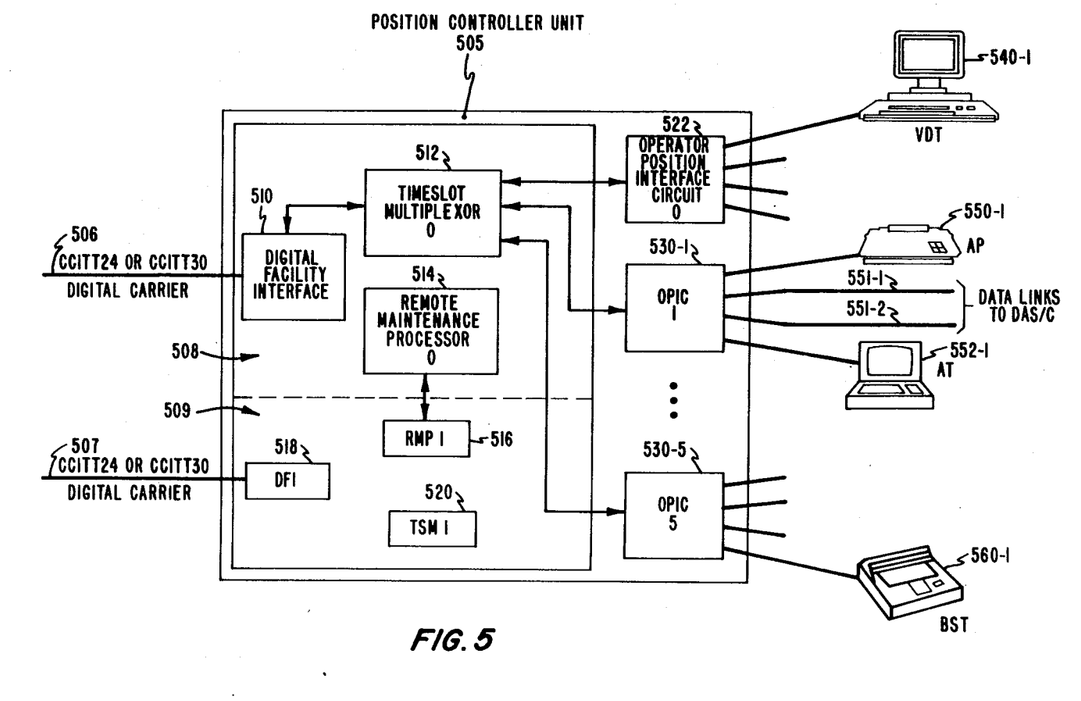
FIG. 5 shows further details of a position controller unit for operator assistance positions.

A PCU supports up to either 18 or 24 operator positions depending on whether it is remoted via CCITT24 or CCITT30 carrier, and DAS/C data links also interface to an SM via a PCU. Six carrier timeslots are used to multiplex 16 kilobits per second (KBPS) data channels, and the remaining timeslots are used for voice and signaling. The data channels may be used for operator terminals, ATs, APs, or DAS/C data links. FIG. 5 provides a block diagram of the PCU design.

The PCU consists of a Digital Facility Interface (DFI 510,518) to terminate a digital carrier circuit, a Timeslot Multiplexor (TSM 512,520), and a Remote Maintenance Processor (RMP 514,516). The TSM multiplexes (demultiplexes) operator voice and data onto (from) the digital carrier. The RMP supports remote maintenance of the PCU under control of software in the host switch. The RMP communicates with the SM over a 4 KBPS Derived Data Link (DDL) on the digital carrier.

To meet the traditional high availability required of operator services, a duplicated PCU has been provided to interface with redundant transmission circuits which operate in an active/standby mode. However, a less costly configuration is available wherein the PCU is operated in a simplex mode with a single transmission circuit. This flexibility allows the customer to optimize the cost of providing operator services relative to the level of service desired.

Within the PCU, there are up to six unduplicated Operator Interface Circuits (OPIC 522,530-1, . . . , 530-5). Each OPIC provides ISDN standard "T" interfaces (four-wire, two 64 KBPS B channels and a 16 KBPS D channel) for up to four terminals. Each OPIC is linked to both TSMs (in a duplicated PCU) and can be accessed by either RMP. Hence, in a duplicated PCU configuration the maximum number of positions lost by a single fault is four.

Only a single B channel (voice) will be used in the first applications. The terminals have a second data port, however, for future connection to the second B channel. This port could be used in features requiring quick transfers of a large amount of data from a data base accessible to the 5ESS switch via a packet switched network. Such access allows the potential for a range of new information services.

The DAS/C terminal communicates via a separate data link with the DAS/C computer. The DA operator keys DA request data into the DAS/C terminal, and receives responses over the separate data link from the DAS/C computer, which data is displayed at the DAS/C terminal. When the DA operator has found the right data, the operator keys a number found indication into the DAS/C terminal, in response to which the DAS/C computer sends a message over the data link connecting the DAS/C computer with the position controller unit. This message is transmitted to the switching module where it is used to control the ARU. The ARU is connected to the requesting customer who then receives the announcement generated by the ARU. In the meantime, the DA operator can be disconnected from the call as soon as the operator has sent the number found indication into the DAS/C terminal.

FIG. 5 shows a position controller unit 505. The position controller unit controls six operator position interface circuits 522, 530-1, . . . , 530-5. Operator position interface circuit 522 is connected to a video display terminal 540-1. Operator position interface circuit 530-1 is connected to an administrative printer 550-1 and administrative terminal 552-1. These are used by operator supervisors to monitor the performance of the operator system. In addition, operator position interface circuit 530-1 is connected by a group of data links 551-1 and 551-2 to directory assistance computer such as directory assistance computer 409. Operator position interface circuit 530-5 is shown connected to a basic services terminal 560-1 similar to basic services terminal 411-1, . . . , 411-n. Each operator position interface circuit provides ISDN standard "T"interfaces (four wire 2 64 kb. B-channels and a 16 kb. D-channel) for up to four terminals. The six operator position interface circuits 522, 530-1, . . . , 530-5 are connected to time slot multiplexor 512 which is connected to a digital facility interface 510 connected to a digital carrier 506. A remote maintenance processor 514 is used to maintain position controller unit 505. Remote maintenance processor 514 is duplicated by a comparable unit 516, time slot multiplexor 512 is duplicated by a time slot multiplexor 520 and digital facility interface 510 is duplicated by digital facility interface 518. Digital facility interface 518 is connected to digital carrier facility 507 connected to a switching module. Only one of the duplicated units is used at one time and the maintenance processors are used to select the active such unit 508 or 509. The active unit is then connected to the active digital carrier facility 506 or 507.

Operator Positions

The operator's position consists of a terminal, a work station, a chair, and the operator's headset. In the DAS/C application a separate terminal, used to access the directory listing database, is also part of the position. The work station is adjustable to allow operators to work comfortably while sitting or standing. Since all the position electronics are in the terminals, customers can choose to provide their own work stations and chairs. Two types of terminals are available; a Basic Services Terminal (BST) for ACD applications such as DA and a Video Display Terminal (VDT) for T&A applications. Both terminals use continuous checks provided by fault-detection circuitry and manually initiated functional tests to provide a diagnostic and repair capability.

With each terminal is an Operator Position Circuit (OPC). The OPC converts digital voice to analog (and vice versa) and provides the 16 KBPS (D channel) interface to the PCU. Its digital circuitry provides echo suppression, audio power limiting, sidetone, and volume control. The analog circuitry accommodates two operator headsets allowing a service assistant or supervisor to plug into the same position as an active operator for assistance. Both terminals also contain a microprocessor which controls the display and keyboard, runs local maintenance tests, and performs required level 3, X.25 packet processing.

Basic Services Terminal

The BST consists of a 20-character vacuum fluorescent display for alphanumeric data, numerous function keys with associated LED indicators, and a number key pad. The operator can receive and control a customer call with the BST. The call may be seized, held, transferred to a third party, conferenced with a third party, or released.

Video Display Terminal

The VDT consists of a 15-inch cathode ray tube (CRT) display and a keyboard. All the operator's input to the system is by keying actions and output from the system to the operator is by the display. Keying actions allow the operator to set up and break down call connections, book calls, and carry out other required operator tasks. The display provides all information needed or entered by the operator to handle the call such as the calling and called numbers, how the call is to be charged, and the call supervision.

An operator, while sitting or standing at the terminal, is able to quickly and easily adjust the position of the display. The screen is flicker-free operating and exhibits no smearing. The displayed information is visually emphasized under software control by use of highlighting, blinking, and reverse video. The detached keyboard incorporates a QWERTY alphabetic key arrangement with a shift key for upper and lower case, a number key pad, and numerous function keys. Most of the keys are labeled for fixed functions. Others, however, provide functions which are dynamically defined by software depending on the current operator task. Labels for these keys are presented in fixed positions on the CRT screen. While in this application a BST is used for the DA operator position, a VDT could also be used for the operator position.

An exemplary call will now be described. A subscriber, such as the subscriber using station 120 (FIG. 2), dials over his subscriber line 119 into his connected switching module 102-n a request for directory assistance. The subscriber is connected from switching module 102-n through communication module 100 to switching module 102-1 and connected via digital carrier 104 to operator office 105. In position controller unit 201 a connection is set up to basic services terminal 202. The operator attending basic services terminal 202 receives the request of the customer verbally and keys appropriate data into the directory assistance computer terminal 205. This information is sent over data line 205-1 to directory assistance computer 204. Information is exchanged in a series of exchanges between the directory assistance computer terminal and the directory assistance computer guided in part by additional verbal information supplied from the customer through basic services terminal 202. When the correct directory number has been found, the operator indicates this number by moving the cursor on the directory assistance computer terminal to that directory number and presses a position release key. The result of pressing the position release key is that the directory assistance computer locates the directory number corresponding to the cursor position and sends this directory number via data link 203 and position controller unit 201 to switching module 102-1.

To describe in detail what happens in switching module 102-1 the detailed diagram of switching module 402-2 will be used, it being understood that the numbers refer to equivalent equipment in switching module 102-1. The message from the directory assistance computer and the operator's basic services terminal is received in digital line and trunk unit 448 and is transmitted via data path 447, time slot interchange 444, data path 443, packet switch interface unit 442 and data path 441 to module control unit 440. In an alternative configuration, the message might pass directly from DLTU 448 via data path 449 to PSIU 442. Module control unit 440 recognizes the operator disconnect and sends control signals over control path 461 to TSI 444 to disconnect the voice connection between the customer and the operator. The module control unit 440 also processes the message from the directory assistance computer containing the appropriate directory number information and sends control signals over path 463 to cause audio response unit 454 to synthesize the required directory assistance response message. MCU 440 also sends control signals over control path 461 to TSI 444 and over control path 463 to set up a connection over voice paths 455 and 464 from ARU 454 to NCT link 403-2, conneted via communication module 100 to switching module 102-n that is connected to the subscriber line 119.

In an alternative arrangement, an operator such as the one stationed at VDT 540-1 could serve as a directory assistance operator. In the alternative arrangement, the operator position and the DAS/C communicate via a packet switch interface unit such as PSIU 443. Using this arrangement, the operator needs only one terminal since the terminal (VDT 540-1) for communicating with the customer and the MCU of the connected switching module is the same terminal used for communicating via data link 551-1 or 551-2 with a DAS/C such as DAS/C 409 (FIG. 4). In order to use this type of arrangement, the response of the PSIU must be very rapid since any delays encountered in traversing the PSIU add to the response time of the DAS/C to the operator position requests for data.

The above description is considered to be only an illustrative embodiment of the invention including an arrangement for communicating with the DAS/C. Other alternatives are possible without departing from the spirit of the invention. For example, switched rather than dedicated control paths could be used for giving the MCU control access to the ARU. It is to be understood that various and numerous other arrangements may be devised by one skilled in the art without departing from the spirit and scope of the invention. The invention is thus limited only as defined in the accompanying claims.

What is claimed is:

1. Switch module means connected to a directory assistance computer, for connecting an incoming network link to an operator position, comprising:

an audio response unit operable for synthesizing a directory assistance announcement;

a module control means for generating first, second and third control signals;

a switching network, responsive to a receipt of said first control signals for establishing a connection between said network link and said operator position; and packet switching interface means responsive to a receipt of an input packet message from said computer for transmitting an output packet message to said module control means;

said module control means responsive to receipt of said output packet message for generating second and third control signals;

said audio response unit comprising a plurality of voice channels connected to said switching network, and being operated in response to a receipt of said second control signals for synthesizing a directory assistance message for transmission over one of said plurality of voice channels to said switching network;

said network responsive to said third control signals for establishing a connection between said network link and said one of said plurality of voice channels from said audio response unit for communication of said assistance message thereover.

2. A directory assistance system comprising an operator position, a port connectable to a subscriber station, and a directory assistance computer, further comprising:

an audio response unit responsive to control signals operable for synthesizing a directory assistance announcement;

module control means for generating first, second, and third control signals;

a switching network responsive to a receipt of said first control signals for establishing a connection between said port and said operator position; and a packet switching interface means responsive to receipt of an input packet message from said computer for transmitting an output packet message to said module control means;

said module control unit responsive to receiving said output packet message for generating second and third control signals;

said audio response unit comprising a plurality of voice channels connected to said switching network and being operated in response to a receipt of said second control signals for synthesizing a directory assistance message for transmission over one of said plurality of voice channels to said switching network;

said switching network responsive to said third control signals for establishing a connection between said port and said one of said plurality of voice channels of said audio response unit for communication of said assistance message thereover.

3. The system of claim 2 further comprising interconnection means for connecting said switching network to said operator position, said interconnecting means comprising:
- a digital line and trunk unit connected to said switching network means and to a digital transmission facility; and
- a digital transmission facility for connection to a plurality of operator positions.

4. The system of claim 2 wherein said directory assistance computer is connected to said packet switching interface means via said switching network.

5. The system of claim 4 wherein said directory assistance computer is connected to said switching network via interconnection means comprising a digital line and trunk unit and a digital transmission facility.

6. The directory assistance system of claim 5 wherein said operator position is connected to said directory assistance computer via said packet switching interface means.

7. The directory assistance system of claim 5 wherein said operator position is connected via a dedicated data path to said directory assistance computer.

8. The directory assistance system of claim 7 wherein said system comprises a plurality of switching modules, a communication module, and a plurality of network links interconnecting each of said switching modules with said communication module, wherein said switching network is a timeslot interchange unit in one of said modules, and wherein said timeslot interchange unit is connected to one of said plurality of network links.

9. The system of claim 8 further comprising interconnection means for connecting said switching network to said operator position, said interconnecting means comprising:
- a digital line and trunk unit connected to said switching network means and to a digital transmission facility; and
- a digital transmission facility for connection to a plurality of operator positions.

10. The system of claim 2 further comprising interconnection means for connecting said switching network to said operator position, said interconnecting means comprising:
- a digital line and trunk unit connected to said switching network means and to a digital transmission facility; and
- a digital transmission facility for connection to a plurality of operator positions.

11. In a directory assistance system serving at least one customer station comprising a circuit switching network, a packet switching network, an audio response unit responsive to control signals, an operator position, an operator assistance computer and a control processor, a method of directory assistance request from said customer station comprising the steps of:
responsive to customer signals from said customer station, setting up a partial connection in said switching network between said customer station and said position under the control of said control processor;
keying data into said position and transmitting first data messages comprising said keyed data from said position to said computer;
sending a second data message from said computer to said processor via said packet switching network;
responsive to said second data message, sending control signals to said audio response unit to synthesize a directory assistance voice message; and
responsive to said second data message, setting up a partial connection in said circuit switching network between said customer station and said audio response unit.

12. A directory assistance system comprising:
switching network means, directory assistance computer means, operator position means, interconnection means, audio response means and control processor means;
said switching network means connectable to a subscriber station and responsive to control signals from said control processor means for setting up a voice connection between
said subscriber station and said operator position means and for setting up a connection between said subscriber station and said audio response means, said subscriber station being connected to a single port of said switching network means;
said directory assistance computer means responsive to first data messages from said operator position means for generating and transmitting second data messages to said operator position means and for generating and transmitting third data messages to said audio response means;
said operator position means for use by a directory assistance operator, comprising means for generating a disconnect signal, transmitting said first data messages to said directory assistance computer means, and responsive to said second data messages for generating a display;
said interconnection means for interconnecting said operator position means and said switching network means;
said audio response means responsive to said third data messages for generating and transmitting directory assistance response messages to said switching network; and
said control processor means responsive to a disconnect signal from said operator position means and to said third data messages for generating control signals to said switching network means for disconnecting said subscriber station from said operator position means and for connecting said audio means to said subscriber station.

13. A communication assistance system having:
an incoming network link;
outgoing link means extendable to an assistance means and an assistance computer;
means for supplying audio messages;
switch network means operable for interconnecting said incoming network link with said outgoing link means;
common control means responsive to a receipt of a call on said incoming network link for operating said network means to interconnect said incoming network link and said outgoing link means for communication of a message request to said assistance means and said assistance computer;

said common control means being responsive to a receipt of an incoming message from said computer for controlling said audio message supply means for effecting a communication of an audio message via said network means to said incoming network link.

14. The communication assistance system of claim 13 further comprising packet switch interface means for communicating said incoming message from said computer to said common control means.

15. The system of claim 14 wherein said switch network means comprises timeslot interchange means.

16. The system of claim 15 wherein said outgoing link means comprises data link means connected to said assistance computer.

17. The system of claim 16 wherein said data link means is connected to said timeslot interchange means, and wherein said timeslot interchange means is connected to said packet switch interface means.

18. A directory assistance system comprising:
an audio response unit for announcing voice messages;
an operator position;
a circuit switching network connected to said operator position and extendable to a customer station;
a packet switching network;
a directory assistance computer;
means controllable in response to receipt of a call from said station to said position over said circuit switching for deriving assistance for said call from said computer; and
means responsive to data message signals received from said computer via said packet switching network for setting up a connection through said circuit switch between said station and said audio response unit and for controlling said audio response unit to announce a voice message.

19. In a directory assistance system comprising a circuit switching network, a packet switching network, an audio response unit, an assistance computer, a control processor, and an operator position, a method of serving an assistance call from a customer station comprising the steps of:
setting up a first connection through said circuit switching network between said station and said position;
keying data into said position for effecting transmission of a first data message from said position to said computer;
sending a second data message over said packet switching network from said computer to said processor in response to said first data message; and
under the control of said processor and in response to said second data message, setting up a second connection in said circuit switching network between said station and said audio response unit and controlling said audio response unit to announce a voice message over said second connection.

* * * * *

UNITED STATES PATENT AND TRADEMARK OFFICE
CERTIFICATE OF CORRECTION

PATENT NO. : 4,677,609

DATED : June 30, 1987

INVENTOR(S) : Richard J. Piereth, Robert L. Potter, John R. Williams

It is certified that error appears in the above-identified patent and that said Letters Patent is hereby corrected as shown below:

Column 12, line 64, delete "unit" and substitute --means--.

Column 13, line 13, delete "interconnecting" and substitute --interconnection--.

Column 13, line 25, delete "interconnection" and substitute --interconnecting--.

Column 13, line 44, delete "interconnecting" and substitute --interconnection--.

Column 13, line 53, delete "interconnecting" and substitute --interconnection--.

Column 13, line 65, after "a method of" insert --processing a --.

Column 14, line 25, before "said subscriber", do not begin a new paragraph.

Column 14, line 39, before "transmitting", insert --for--.

Column 16, line 1, after "switching, insert --network--.

Column 16, line 6, after "circuit", delete "switch" and substitute --switching network--.

Signed and Sealed this

Twenty-ninth Day of December, 1987

Attest:

DONALD J. QUIGG

Attesting Officer

Commissioner of Patents and Trademarks